(12) United States Patent
Mielke

(10) Patent No.: US 7,449,658 B2
(45) Date of Patent: Nov. 11, 2008

(54) METHOD FOR THE RESTORATION OF DAMAGED AREAL COMPONENTS

(75) Inventor: Rainer Mielke, Oberursel (DE)

(73) Assignee: Roll-Royce Deuschland Ltd & Co KG, Blankenfelde-Mablow (DE)

( * ) Notice: Subject to any disclaimer, the term of this patent is extended or adjusted under 35 U.S.C. 154(b) by 0 days.

(21) Appl. No.: 10/817,958

(22) Filed: Apr. 6, 2004

(65) Prior Publication Data

US 2005/0029235 A1 Feb. 10, 2005

(30) Foreign Application Priority Data

Apr. 12, 2003 (DE) ............... 103 16 966

(51) Int. Cl.
B23K 26/34 (2006.01)

(52) U.S. Cl. ............... 219/121.66; 29/889.1

(58) Field of Classification Search ...............
219/121.63–121.66; 228/119, 212, 213, 228/248.1, 50; 156/94, 98; 29/889.1, 889.7, 29/527.2, 527.3, 402.07, 402.18; 164/92.1; 416/223 A
See application file for complete search history.

(56) References Cited

U.S. PATENT DOCUMENTS

| | | | | |
|---|---|---|---|---|
| 3,777,106 A * | 12/1973 | Nuccel | ............... | 219/73.11 |
| 4,195,475 A * | 4/1980 | Verdouw | ............... | 60/754 |
| 4,237,361 A * | 12/1980 | Zwintscher et al. | ............... | 219/76.1 |
| 4,246,463 A * | 1/1981 | Shutt et al. | ............... | 219/73.2 |
| 4,509,673 A * | 4/1985 | Schmidt et al. | ............... | 228/212 |
| 4,726,104 A * | 2/1988 | Foster et al. | ............... | 29/889.1 |
| 4,775,092 A * | 10/1988 | Edmonds et al. | ............... | 228/222 |
| 4,832,252 A * | 5/1989 | Fraser | ............... | 228/119 |
| 4,841,117 A | 6/1989 | Koromzay | | |
| 4,842,663 A * | 6/1989 | Kramer | ............... | 156/98 |
| 5,038,014 A | 8/1991 | Pratt et al. | | |
| 5,067,234 A * | 11/1991 | Fraser | ............... | 29/889.1 |
| 5,147,999 A * | 9/1992 | Dekumbis et al. | ............... | 219/121.63 |
| 5,165,758 A * | 11/1992 | Howe | ............... | 300/21 |
| 5,235,745 A * | 8/1993 | Fraser | ............... | 29/889.1 |
| 5,261,480 A * | 11/1993 | Wortmann et al. | ............... | 164/256 |
| 5,321,228 A * | 6/1994 | Krause et al. | ............... | 219/121.84 |
| 5,553,370 A * | 9/1996 | Pepe | ............... | 29/889.1 |
| 5,701,669 A * | 12/1997 | Meier | ............... | 29/889.1 |
| 5,913,555 A | 6/1999 | Richter et al. | | |
| 6,049,979 A * | 4/2000 | Nolan et al. | ............... | 29/889.1 |
| 6,172,327 B1 * | 1/2001 | Aleshin et al. | ............... | 219/121.64 |

(Continued)

FOREIGN PATENT DOCUMENTS

DE 003813157 A1 * 12/1988

(Continued)

OTHER PUBLICATIONS

Metals Handbook, "Superalloys; Processing", 12 pages, 2002.*

(Continued)

*Primary Examiner*—Samuel M Heinrich
(74) *Attorney, Agent, or Firm*—Timothy J. Klima

(57) ABSTRACT

Repair of compressor blades (6) of aircraft engines is performed by build-up welding against an essentially horizontal backing (8) whose surface shape is the exact negative of the respective bottom side of the blade to be repaired. With low rework effort, the blades of blisks can, in the installed state, be repaired or fully restored at any point with high quality upon removal of the damaged portion.

17 Claims, 2 Drawing Sheets

U.S. PATENT DOCUMENTS

| | | | |
|---|---|---|---|
| 6,198,187 B1 * | 3/2001 | Asao et al. | 310/68 D |
| 6,238,187 B1 * | 5/2001 | Dulaney et al. | 416/241 R |
| 6,326,585 B1 | 12/2001 | Aleshin et al. | |
| 6,468,367 B1 * | 10/2002 | Mukira et al. | 148/428 |
| 6,469,271 B1 * | 10/2002 | McGoey | 219/76.14 |
| 6,580,959 B1 * | 6/2003 | Mazumder | 700/121 |
| 6,607,114 B2 * | 8/2003 | Reser et al. | 228/49.1 |
| 6,754,955 B1 * | 6/2004 | Carl et al. | 29/889.1 |
| 2002/0015654 A1 * | 2/2002 | Das et al. | 419/8 |
| 2003/0042233 A1 * | 3/2003 | Kelly | 219/121.64 |

FOREIGN PATENT DOCUMENTS

| | | | |
|---|---|---|---|
| DE | 3942051 | | 8/1990 |
| DE | 4032615 A1 * | | 4/1992 |
| DE | 19547903 | | 3/1997 |
| DE | 19642980 | | 8/1998 |
| DE | 19957771 | | 6/2001 |
| EP | 0403736 | | 12/1990 |
| JP | 60115370 A | * | 6/1985 |
| JP | 361069424 A | * | 4/1986 |
| JP | 09314364 A | * | 12/1997 |
| JP | 10308472 A | * | 11/1998 |
| JP | 02001025863 A | * | 1/2001 |

OTHER PUBLICATIONS

IBM Technical Disclosure Bulletin; NB930633; "Thermal Control of High Powere Devices During Card/Circuit Test"; Jun. 1, 1993.*

ASM Handbooks Online; Controlling Heat Effects; 1 page; copyright 2003.*

ASM Handbooks Online; Mitigation of Intergranular SCC in BWR Piping; sub heading "Heat Sink Welding"; pp. 1-3; copyright 2003.*

German Search Report dated Dec. 2, 2003.

European Search Report dated Jul. 15, 2004.

* cited by examiner

METHOD FOR THE RESTORATION OF DAMAGED AREAL COMPONENTS

This application claims priority to German Patent Application DE10316966.0 filed Apr. 12, 2003, the entirety of which is incorporated by reference herein.

BACKGROUND OF THE INVENTION

This invention relates to a method for the restoration of worn or otherwise damaged components by build-up welding, in particular, solid, three-dimensional compressor blades of aircraft engines.

The compressor blades of aircraft engines are subject to considerable erosion in the area of the tip and—if the content of sand in the air is high—also in the area from the tip to the trailing edge. In addition, the leading edge of the compressor blades, in particular, is prone to damage by larger objects (by small stones, for example). Damaged or worn blades can be replaced by new ones if they are separately manufactured and detachably mounted to the compressor disk. This already costly method can, however, not be applied to compressor wheels made in blisk technology where the disk forms an integral part with the blades.

In fact, the possibilities for the repair of the compressor blades are limited. Here, laser powder build-up welding presents itself as one of the few prospects, in particular under the aspect that a mold supporting the weld pool conformally contains the tip area to be restored, allowing the rework effort to be kept low in comparison with free build-up welding. Laser powder build-up welding in a mold is, however, disadvantageous in that the blade can only be restored in a confined tip area of a few millimeters, this being due to recesses limiting the depth of input of the laser beam and the powder in the mold and, further, the complex, three-dimensional blade shape impeding the removal of a longer mold from the repaired blade upon build-up welding.

BRIEF SUMMARY OF THE INVENTION

In a broad aspect, the present invention provides a method and an apparatus for the repair of worn or damaged solid compressor blades, in particular, blisk-technology compressor blades, by build-up welding enabling three-dimensionally shaped blades to be restored on each edge and in any required length with low rework effort.

It is a particular object of the present invention to provide solution to the above problems by a method and by an apparatus for the performance of this method in accordance with the features described herein. Further advantageous embodiments of the present invention will become apparent from the description below.

The principal idea of the invention is that the restoration of the damaged component portion by build-up welding is performed directly on an essentially horizontal backing whose surface shape is the exact negative of the bottom side of the respective component or component portion. The surface of the backing form-fits the bottom side of the component portion to be restored or the remaining component portion, respectively.

Since the backing, which is temporarily attached to the bottom side of the remaining compressor blade portion, can be removed downwards after repair welding, even three-dimensionally shaped compressor blades can be repaired or fully restored at any point. Welding is executable, in high quality, in the technically advantageous gravity position, even on compressor blisks in the installed state, with weld layers being depositable cross-sectionally on top of one another in accordance with the respective blade thickness.

Build-up welding is performed co-directionally or contra-directionally parallel with or vertical to a sectional plane at which the damaged portion was separated from the component.

In accordance with a further feature of the present invention, the component portion to be restored is determined by imaging methods, with the movements of the laser beam (13a) and of the powder feed nozzle (14) being calculated, and the welding process exactly controlled, on this basis.

The apparatus according to the present invention comprises a welding cavity, with a cavity bottom forming the backing whose inner surface is the negative of the respective blade side, and with side walls whose inner contour corresponds to the counter of the leading or trailing edge of the blade to be repaired.

BRIEF DESCRIPTION OF THE DRAWINGS

The present invention is more fully described in the light of the accompanying drawings showing a preferred embodiment. In the drawings.

DETAILED DESCRIPTION OF THE INVENTION

Figure 3:
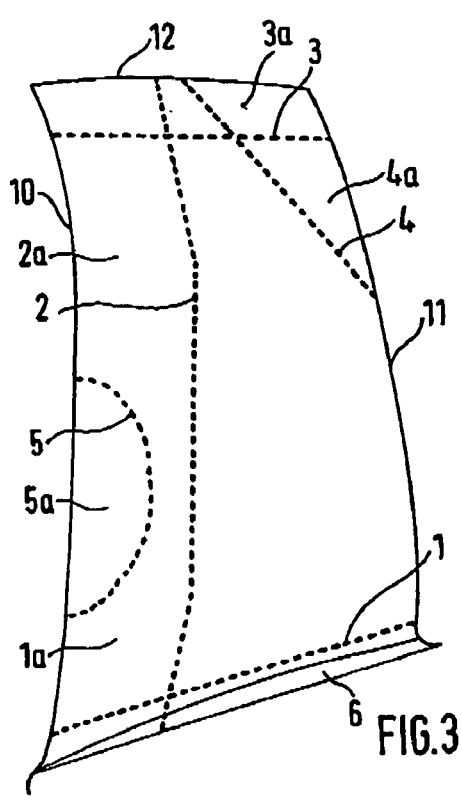
FIG. 3 is a side view of compressor blade in which the area separated due to wear or damage is indicated by the respective dotted lines from which the compressor blade is restored by build-up welding.
Figure 4:
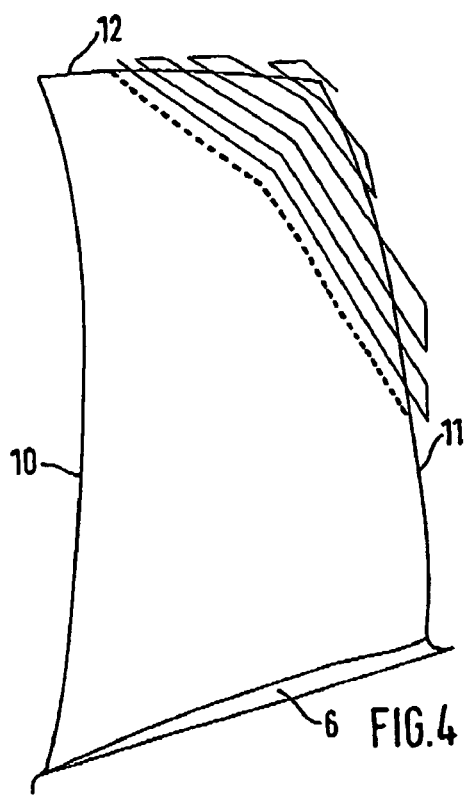
FIG. 4 is a side view of a compressor blade whose repair is performed by contour-parallel contra-directional build-up welding along the separated side of the compressor blade.
Figure 5:
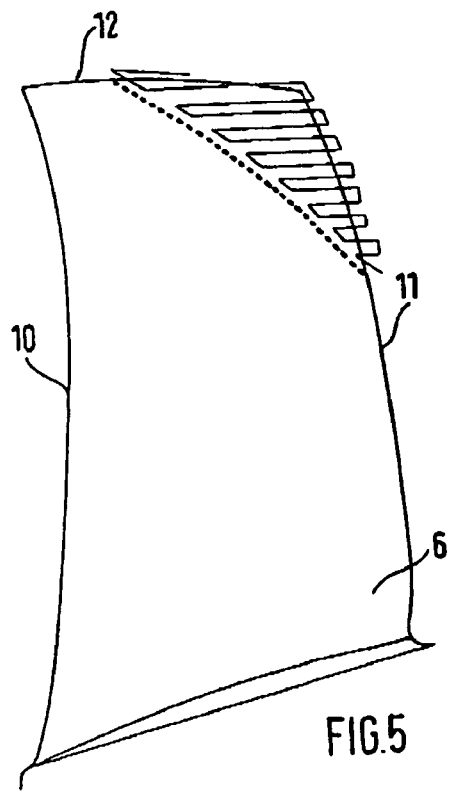
FIG. 5 is a side view of a compressor blade on which build-up welding is performed contra-directionally and essentially vertically to the separated side of the compressor blade.

In accordance with FIG. 3, the following primary cases of blade damage and restoration apply:

1. The blade is unusable over its entire length and will, therefore, be separated at the blade root along line 1 and restored from this sectional plane.
2. The blade is deformed at the leading edge. The damaged portion will be separated along line 2 and the blade restored from this sectional plane.
3. The tip of the blade is, as usual, eroded by the effect of flow and will be repaired by build-up welding from line 3.
4. The blade is worn in a corner area at the tip and trailing edge by an exceptionally high content of airborne particles and will be repaired from line 4.
5. The blade is damaged by a foreign object in a limited area on the leading edge. The damaged area will be cut out along line 5 and the blade restored along this sectional plane.

Figure 1:
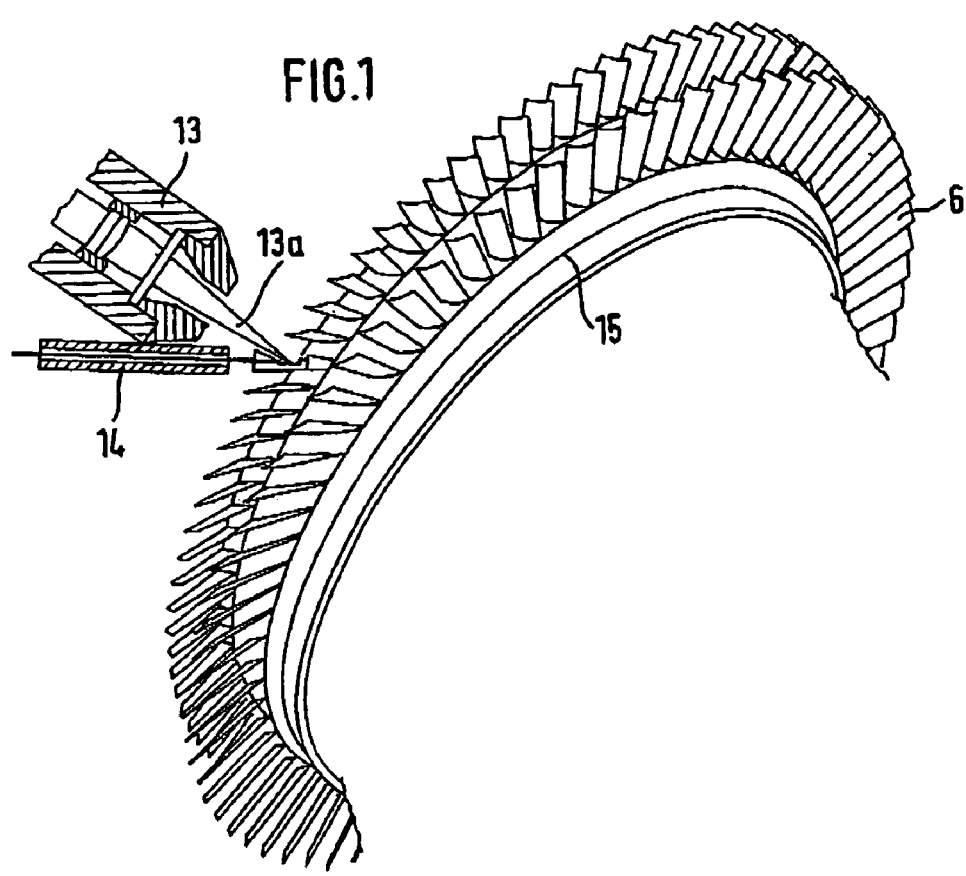
FIG. 1 is a partial view of a two-stage compressor wheel made in blisk technology on which blade repair, in accordance with the present invention, is performed in horizontal gravity position by laser powder build-up welding.
Figure 2:
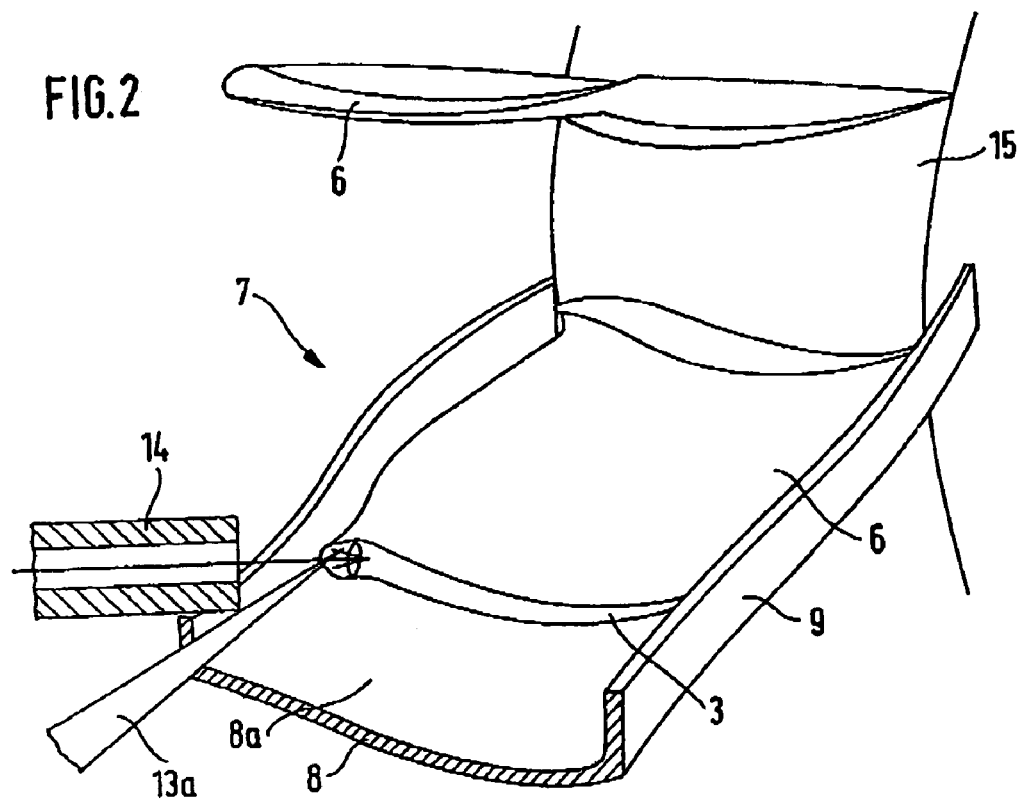
FIG. 2 is a detail of FIG. 1 in which a compressor blade to be restored is placed in a welding cavity.
Figure 6:
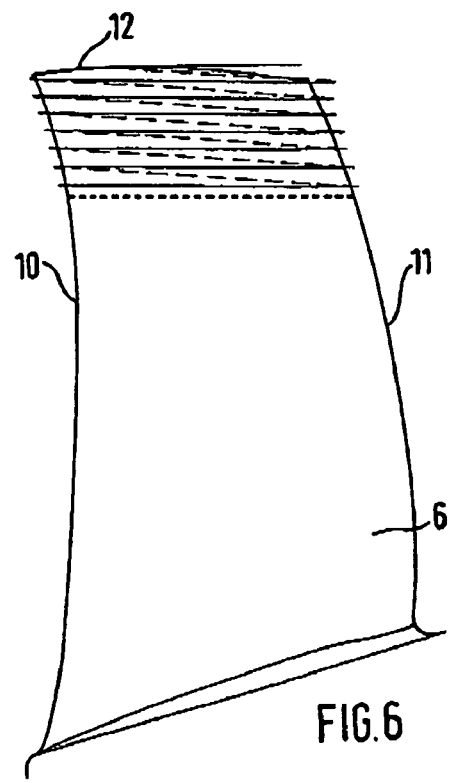
FIG. 6 is a side view of a compressor blade on which build-up welding is performed co-directionally on the separated side of the compressor blade.

Upon removal of the damaged portion 1a, 2a, 3a, 4a or 5a of the compressor blade 6 at the respective dotted line 1, 2, 3, 4 or 5, a welding cavity 7 is detachably fitted in a suitable manner to the bottom side of the essentially horizontally positioned compressor blade 6 which forms an integral part with the blisk 15. The mating face 8*a* of the welding cavity bottom 8 of the welding cavity 7 which faces the suction side or the pressure side of the compressor blade 6 is the exact negative of the respective blade side, while the form of the side walls 9 corresponds to the contour of the leading edge 10 and/or the trailing edge 11 of the compressor blade 6. In the example shown in FIG. 2, the tip 12 of the compressor blade 6, which was subject to normal flow wear, was separated along line 3 (sectional plane). Upon removal of the blade portion 3*a*, the welding cavity 7, whose length corresponds at least to the length of the blade, is attached temporarily to the compressor blade 6 and a laser powder welding apparatus 13 for the generation of a laser beam 13*a* with separate powder feed nozzle 14 with integrated protective gas supply is brought into position. Subsequently, with the blade in the horizontal position parallel to line 3, weld seam after weld seam will be deposited, for example co-directionally according to FIG. 6. Depending on the respective thickness of the blade, two or more seams can be deposited on top of each other on the welding cavity bottom 8. The travels of the laser optics and the powder feed nozzle are computer-calculated beforehand on the basis of the missing blade portion determined by imaging methods in comparison with a master blade, enabling the welding process to be performed automatically and ensuring a high quality of the weld. Powder can be input from the side or circularly if space between the blades permits. Upon completion of the welding process, the welding cavity 7 is detached and removed downwards from the compressor blade 6. Subsequently, the compressor blade 6 is smoothened with electrochemical or cutting methods to produce the required surface finish. Components other than blades can be repaired by the present invention.

LIST OF REFERENCE NUMERALS

1 to 5 sectional plane (separation cut or line), at which the damaged blade portion will be separated and restored,
1*a* to 5*a* separated (restored) blade portion
6 compressor blade
7 welding cavity
8 welding cavity bottom (backing)
8*a* mating face
9 side walls of 7
10 leading edge of 6
11 trailing edge of 6
12 tip of 6
13 laser powder welding apparatus
13*a* laser beam
14 powder feed nozzle with integrated protective gas supply
15 Blisk

What is claimed is:

1. A method for the restoration of damaged blades of gas turbines by build-up welding, comprising:
    melting a material in subsequent layers along a sectional cut at which a damaged blade portion was separated from a reusable blade portion such that the material welds to the reusable blade portion and builds up to desired dimensions;
    performing the build-up welding against a generally u-shaped and essentially horizontal welding cavity, the welding cavity having a first longitudinal portion which form-fits a remaining blade surface from the reusable blade portion to accurately position the welding cavity with respect to the reusable blade portion, the welding cavity also having a second longitudinal portion extending from the first longitudinal portion and which includes an upward facing surface having a shape which is substantially a negative of at least one of a suction side surface of varying curvature and a pressure side surface of varying curvature of a blade portion to be restored, and at least one upwardly extending side wall which is substantially a negative of at least one of a varying leading edge and a varying trailing edge, such that upon filling the second longitudinal portion of the welding cavity with the build-up welding, the build-up welding will be substantially in a final desired shape of the blade portion to be restored to minimize required finishing work on the blade portion to be restored, an open upward side of the welding cavity providing access to an entire area to be restored by the build-up welding, as well as providing easy removal of the welding cavity from the blade in a direction generally normal to an axis of the blade after the build-up welding has been performed, the complex three dimensional shape of the restored blade portion prohibiting removal of the welding cavity from the blade in a direction generally parallel to an axis of the blade.

2. A method in accordance with claim 1, wherein at least two weld layers are applied on top of one another, in correspondence with the thickness of the blade.

3. A method in accordance with claim 2, wherein build-up welding is performed at least one of co-directionally and contra-directionally parallel to the sectional cut.

4. A method in accordance with claim 2, wherein build-up welding is performed at least one of co-directionally and contra-directionally vertical to the sectional cut.

5. A method in accordance with claim 4, wherein protective-gas build-up welding is performed by laser powder welding technology.

6. A method in accordance with claim 5, wherein weld material is supplied from at least one of a side and circularly.

7. A method in accordance with claim 6, wherein a size and shape of the blade to be restored, as well as the transition geometry, are determined by imaging methods, and the travels for the deposition of the weld layers are calculated and controlled by computer.

8. A method in accordance with claim 7, wherein the welding process is performed on one of a one-stage or multi-stage compressor blisk in the installed state.

9. A method in accordance with claim 8, wherein the restored blade is subject to surface processing and thermal treatment.

10. A method in accordance with claim 1, wherein build-up welding is performed at least one of co-directionally and contra-directionally parallel to the sectional cut.

11. A method in accordance with claim 1, wherein build-up welding is performed at least one of co-directionally and contra-directionally vertical to the sectional cut.

12. A method in accordance with claim 1, wherein protective-gas build-up welding is preformed by laser powder welding technology.

13. A method in accordance with claim 12, wherein weld material is supplied from at least one of a side and circularly.

14. A method in accordance with claim 1, wherein a size and shape of the blade to be restored, as well as the transition geometry, are determined by imaging methods, and the travels for the deposition of the weld layers are calculated and controlled by computer.

15. A method in accordance with claim 1, wherein the welding process is performed on one of a one-stage or multi-stage compressor blisk in the installed state.

16. A method in accordance with claim 1, wherein the restored blade is subject to surface processing and thermal treatment.

17. A method for the restoration of a damaged three dimensional component of a gas turbine by build-up welding, comprising:

melting a material in subsequent layers along a sectional cut at which a damaged component portion was separated from a reusable component portion such that the material welds to the reusable component portion and builds up to desired dimensions;

performing the build-up welding against a generally u-shaped and essentially horizontal welding cavity, the welding cavity having a first longitudinal portion which form-fits a remaining component surface from the reusable component portion to accurately position the welding cavity with respect to the reusable component portion, the welding cavity also having a second longitudinal portion extending from the first longitudinal portion and which includes an upward facing surface having a shape which is substantially a negative of a side surface of varying curvature of a component portion to be restored, and at least one upwardly extending side wall which is substantially a negative of a varying edge, such that upon filling the second longitudinal portion of the welding cavity with the build-up welding, the build-up welding will be substantially in a final desired shape of the component portion to be restored to minimize required finishing work on the component portion to be restored, an open upward side of the welding cavity providing access to an entire area to be restored by the build-up welding, as well as providing easy removal of the welding cavity from the component portion in a direction generally normal to an axis of the component after the build-up welding has been performed, the complex three dimensional shape of the restored component portion prohibiting removal of the welding cavity from the component in a direction generally parallel to an axis of the component.

* * * * *